United States Patent
Livingston (10) Patent No.: US 10,315,586 B2
(45) Date of Patent: Jun. 11, 2019

(54) HITCH MOUNTED THEATER SYSTEM

(71) Applicant: Joseph Andrew Livingston, Sandy, UT (US)

(72) Inventor: Joseph Andrew Livingston, Sandy, UT (US)

( * ) Notice: Subject to any disclaimer, the term of this patent is extended or adjusted under 35 U.S.C. 154(b) by 0 days.

(21) Appl. No.: 15/372,285

(22) Filed: Dec. 7, 2016

(65) Prior Publication Data

US 2017/0158146 A1    Jun. 8, 2017

Related U.S. Application Data

(60) Provisional application No. 62/263,973, filed on Dec. 7, 2015.

(51) Int. Cl.

| | |
|---|---|
| *B60R 11/00* | (2006.01) |
| *B60R 11/02* | (2006.01) |
| *F16M 11/04* | (2006.01) |
| *F16M 11/34* | (2006.01) |
| *F16M 13/02* | (2006.01) |
| *F16M 11/20* | (2006.01) |
| *G03B 21/56* | (2006.01) |
| *G03B 29/00* | (2006.01) |

(52) U.S. Cl.
CPC ....... *B60R 11/0229* (2013.01); *F16M 11/041* (2013.01); *F16M 11/046* (2013.01); *F16M 11/2092* (2013.01); *F16M 11/34* (2013.01); *F16M 13/022* (2013.01); *G03B 21/56* (2013.01); *G03B 29/00* (2013.01); *B60R 2011/004* (2013.01); *B60R 2011/0052* (2013.01); *B60R 2011/0057* (2013.01); *F16M 2200/027* (2013.01)

(58) Field of Classification Search
CPC .......... B60R 11/0229; B60R 2011/004; B60R 2011/0052; B60R 2011/0057; F16M 11/041; F16M 11/046; F16M 11/2092; F16M 11/34; F16M 13/022; F16M 2200/027; G03B 21/56; G03B 29/00
USPC .................................. 248/476; 40/591, 590
See application file for complete search history.

(56) References Cited

U.S. PATENT DOCUMENTS

| | | | | |
|---|---|---|---|---|
| 4,769,700 A * | 9/1988 | Pryor | ................... | A01B 69/008 348/120 |
| 5,281,985 A * | 1/1994 | Chan | ...................... | G09F 21/04 348/744 |
| 5,409,081 A * | 4/1995 | Reeves | ................. | A01M 31/02 182/116 |
| 5,871,131 A * | 2/1999 | Low | ......................... | B60R 9/06 211/17 |
| 6,932,374 B1 * | 8/2005 | Timms | ..................... | B60D 1/36 248/467 |
| 7,080,814 B1 * | 7/2006 | Brooks | ................ | A45C 13/385 248/441.1 |

(Continued)

*Primary Examiner* — Nkeisha Smith (57) ABSTRACT

A device and method for the display of images on a screen is described. The device includes a frame assembly configured to hold a screen. The frame assembly includes a hitch for attachment to a receiver hitch of a vehicle. The screen can be adjusted to face either a forward or rearward direction. The device further includes a stand. The stand may be configured to rest on the vehicle for projection onto the screen or rest on the ground. The stand supports a displaying device and is configured to adjust the elevation of the displaying device to affect the displayed image.

16 Claims, 11 Drawing Sheets

(56) References Cited

U.S. PATENT DOCUMENTS

| | | | | |
|---|---|---|---|---|
| 7,171,773 | B2* | 2/2007 | Haggard, Jr. | G09F 7/12 |
| | | | | 40/591 |
| 7,372,628 | B2* | 5/2008 | Karlsen | G03B 21/62 |
| | | | | 359/443 |
| 7,621,555 | B2* | 11/2009 | Wilkinson | B60D 1/36 |
| | | | | 280/477 |
| 7,911,692 | B2* | 3/2011 | Okamoto | G03B 21/56 |
| | | | | 359/449 |
| 8,888,121 | B2* | 11/2014 | Trevino | B60D 1/36 |
| | | | | 280/477 |
| 9,330,645 | B2* | 5/2016 | Sawhney | G10G 5/00 |
| 9,341,307 | B2* | 5/2016 | Seal | G09F 13/02 |
| 2003/0234512 | A1* | 12/2003 | Holub | B60D 1/36 |
| | | | | 280/432 |
| 2006/0265922 | A1* | 11/2006 | Shaffer, Jr. | G09F 21/04 |
| | | | | 40/591 |
| 2010/0202822 | A1* | 8/2010 | Smith | A63H 3/005 |
| | | | | 401/195 |
| 2013/0134268 | A1* | 5/2013 | Wessells | F16B 17/00 |
| | | | | 248/125.8 |
| 2015/0146114 | A1* | 5/2015 | Williams | H04N 5/655 |
| | | | | 348/837 |
| 2016/0061377 | A1* | 3/2016 | Nakatani | F16M 11/242 |
| | | | | 248/184.1 |
| 2016/0084431 | A1* | 3/2016 | Chen | F16M 11/28 |
| | | | | 307/43 |
| 2016/0342073 | A1* | 11/2016 | Myers | G03B 17/561 |
| 2017/0037994 | A1* | 2/2017 | Sakaguchi | F16M 11/041 |
| 2017/0059088 | A1* | 3/2017 | Galvez | F16M 13/04 |
| 2017/0102608 | A1* | 4/2017 | Risher, Jr. | G03B 21/56 |
| 2018/0106418 | A1* | 4/2018 | Anglin | F16M 11/28 |

* cited by examiner

HITCH MOUNTED THEATER SYSTEM

CLAIM OF PRIORITY

This application claims the benefit of U.S. Provisional Application No. 62/263,973, filed 7 Dec. 2015. The information contained therein is hereby incorporated by reference.

BACKGROUND

1. Field of the Invention

The present application relates generally to an apparatus for a portable projector screen and stand devices. More specifically, the present application is a portable projector screen that is supported through a hitch receiver of any vehicle and an adjustable stand to carry a projector.

2. Description of Related Art

Watching digital media such as videos are a regular past time. Watching videos or digital media may be done in different ways. Options include viewing such media on portable handheld devices. These are good but are limited to only a few people at a time. Viewing by larger audiences requires a larger viewing area more realistically done through a large viewing screen. Examples would be a large television or a screen for projection of the image. For the most part, these devices are located inside buildings and not readily suited for outdoor use. When outdoors, they are usually not portable (i.e. large television under a patio). A new device is needed to allow for remote viewing of digital media on a large scale. The system is needing to be portable and adaptable to various terrain and conditions. Although strides have been made, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with traditional security devices for doors. In particular, the device is as system configured to provide a user with the flexibility of viewing digital media from a projector in any outdoor location. The system is fully transportable and easily erected for viewing. The system supports the viewing screen from the receiver hitch of a vehicle. A projector is supported on the vehicle itself or on the ground. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The device and method of the present application is illustrated in the associated drawings. The device includes at least one projector stand and a frame assembly. The projector stand may be either a ground based stand that is configured to extend to greater lengths or a roof top stand for selective attachment to a vehicle. The stands are fully adjustable to ensure proper viewing angle. The frame assembly includes a screen, a hitch arm, and a frame. The frame assembly is configured to adjust the location of the screen and provide support when viewing. Locating the projector on one of the stands allows a user the ability to display digital media on the screen for viewing pleasure. Additional features and functions of the device are illustrated and discussed below.

Figure 1:
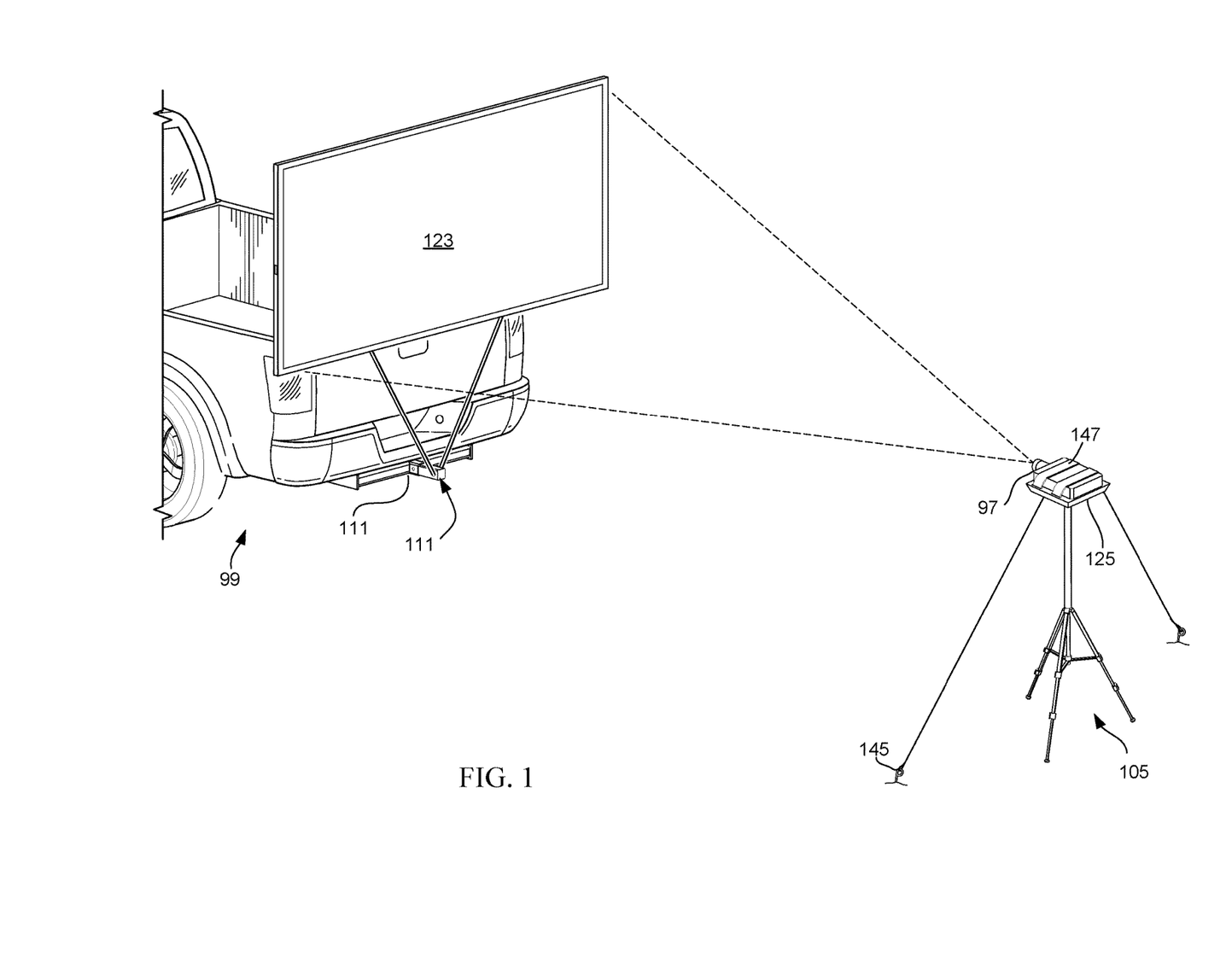
FIG. 1 is a perspective view of a hitch mounted theater device and system according to an embodiment of the present application.
Figure 2:
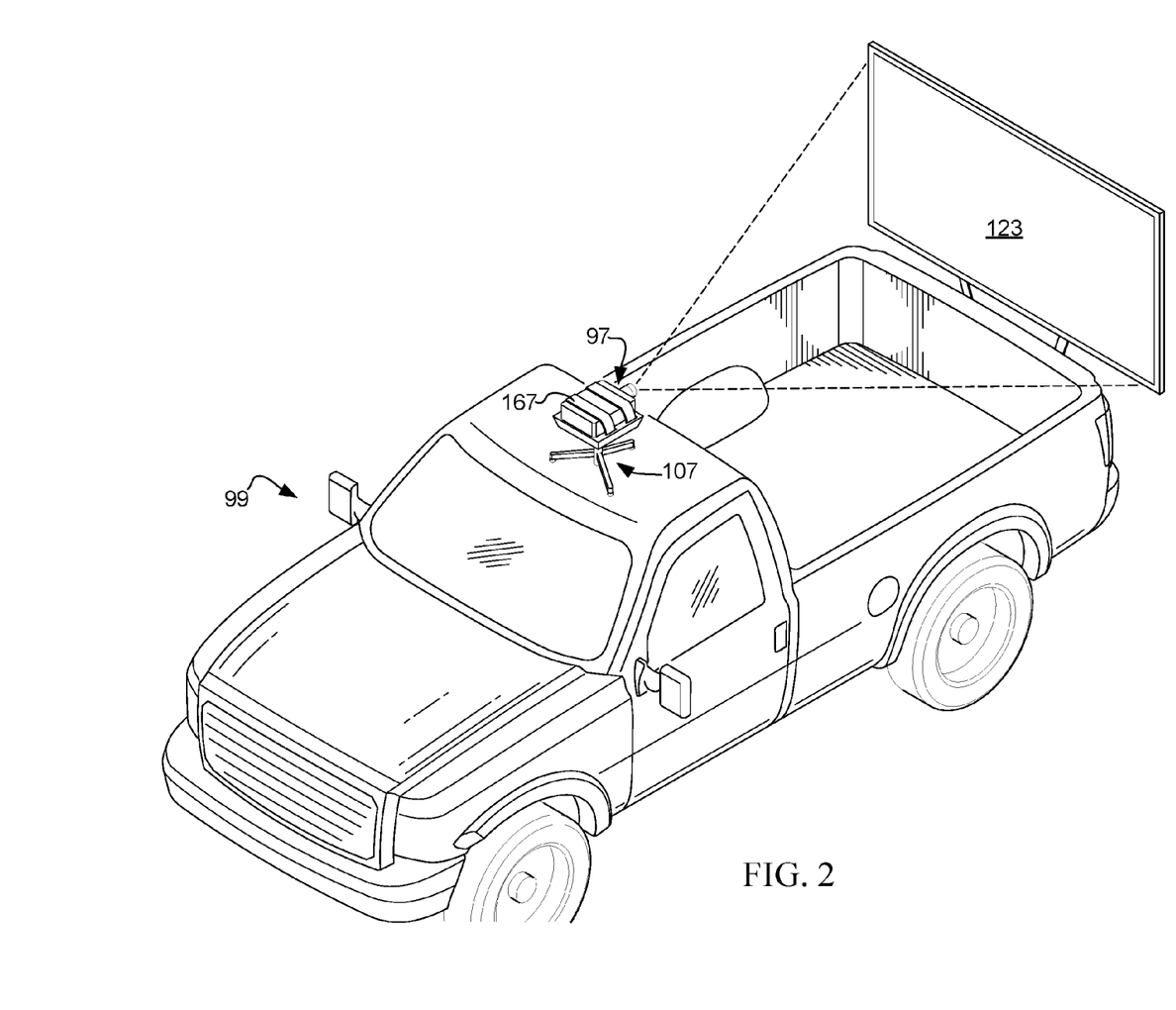
FIG. 2 is an alternative perspective view of the hitch mounted theater device and system of FIG. 1 with an alternate stand.

Referring now to the drawings wherein like reference characters identify corresponding or similar elements in form and function throughout the several views. FIGS. 1-2 illustrate the theater device/system 101. System 101 includes a frame assembly 103, a stand 105, and a vehicle stand 107. System 101 is configured to provide a stable base for the erecting of frame assembly 103, for the displaying of a projected image from at least one of stands 105 and 107. FIG. 1 illustrates frame assembly 103 with stand 105. FIG. 2 illustrates frame assembly 103 with stand 107. It is understood that system 101 may be utilized and purchased wherein only one stand 105/107 is purchased.

In general, system 101 provides a portable projector screen that is supported by attaching it to the hitch receiver 95 of any vehicle. Frame assembly 103 slides into the receiver 95 of a vehicle 99. Use of system 101 provides a true drive in theater experience allowing users the ability to view images anywhere on a big screen. System 101 utilizes the vehicle's hitch receiver to support the weight of the screen, thus allowing the viewer to set up the screen and watch a movie on terrain that would be hard for other projector screens to be utilized on. It is a true drive in theater that can be used in the mountains, on the beach, at tailgate parties, etc. without having to worry about perfectly flat ground. More importantly, this product promotes the idea that one can have a personal drive-in theatre experience virtually anywhere that a vehicle can go. It can be used on any vehicle with a hitch, Truck, car, SUV, 4-wheeler, etc.

Figure 3:
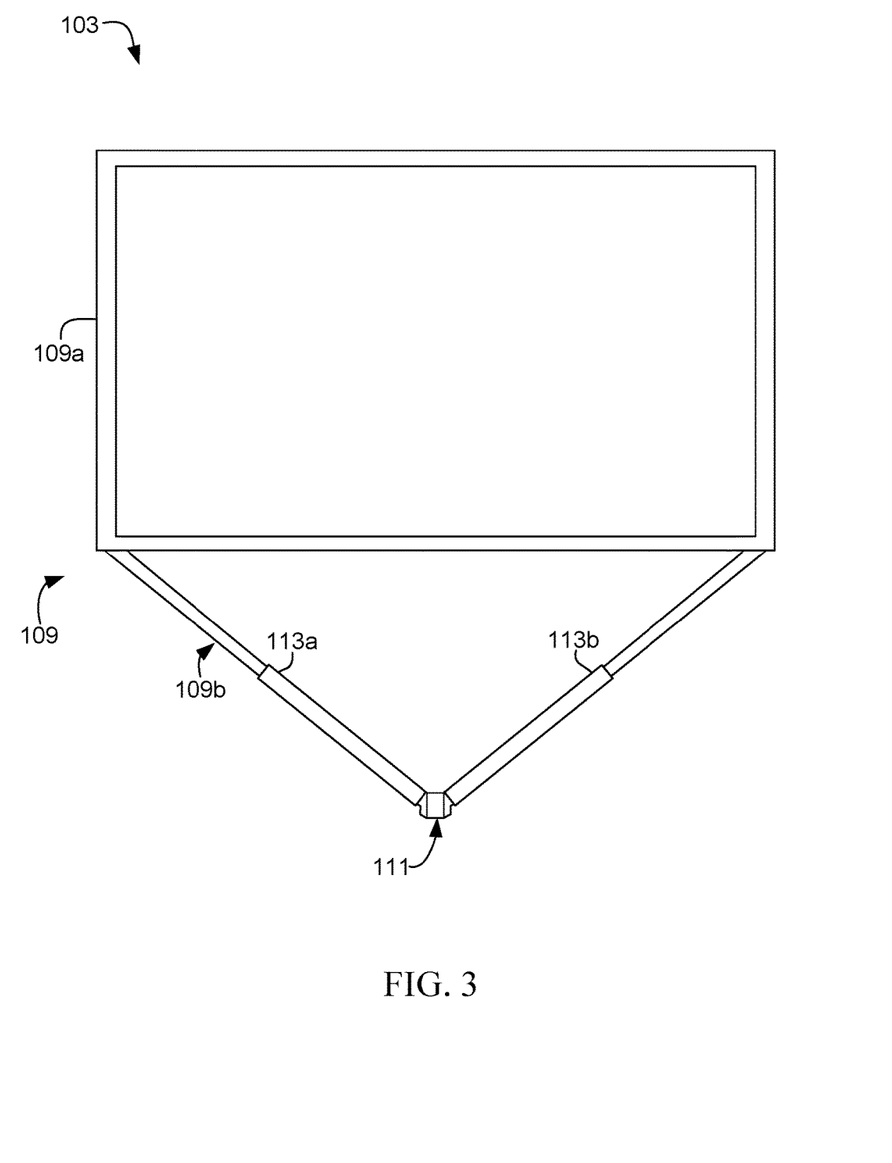
FIG. 3 is a front view of a frame assembly in the hitch mounted theater device and system of FIG. 2.
Figure 4:
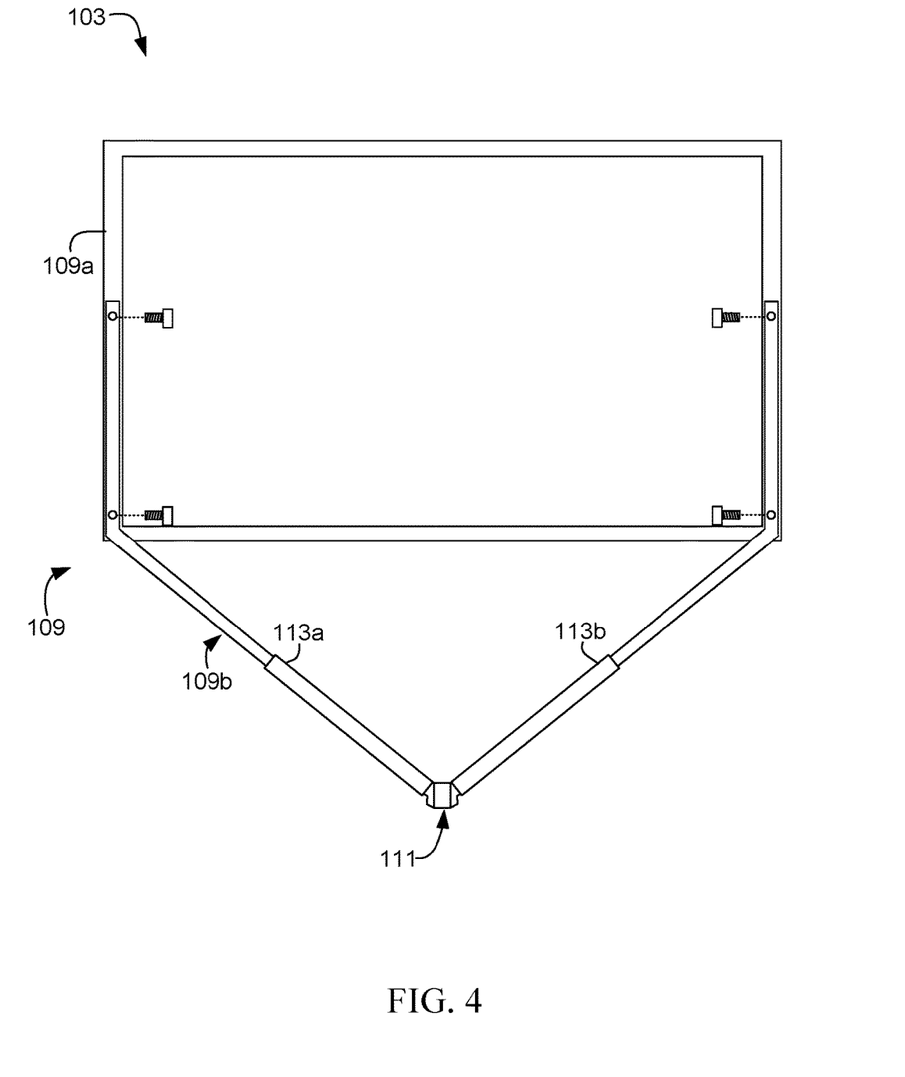
FIG. 4 is a rear view of the frame assembly of FIG. 3.
Figure 5:
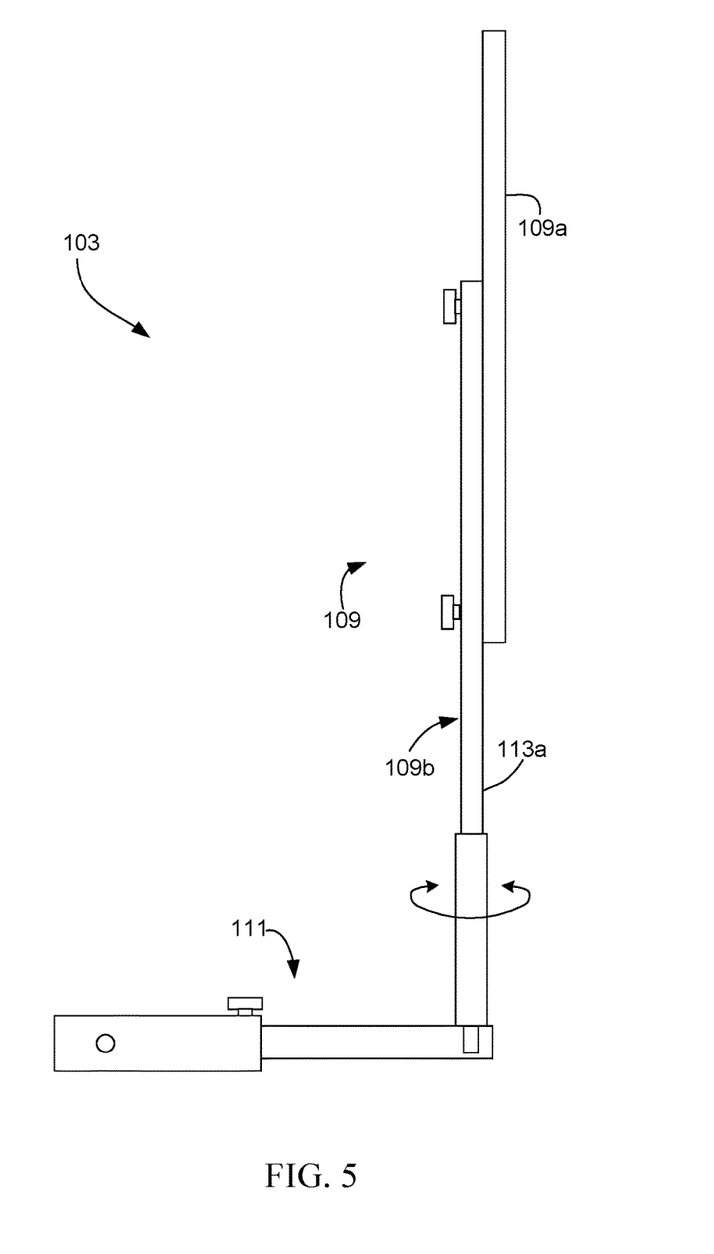
FIG. 5 is a side view of the frame assembly of FIG. 3.

Referring now also to FIGS. 3-7 in the drawings, frame assembly 103 is illustrated. Frame assembly 103 includes frame 109 and a hitch arm 111. In particular, FIGS. 3-5 show frame assembly in front, rear, and side views respectively. Frame assembly is configured to provide a structure for the attachment of a screen in which to view the images. Frame 109 can be separated into 2 portions, namely the upper portion 109a where the screen attaches directly; and the lower portion 109b configured to couple directly to hitch arm 111.

Frame 109 is constructed out of any lightweight rigid material. It is ideal to maintain a relatively small diameter or sizing to assist in transportation simplicity and set up. Frame upper portion 109a may be constructed from a plurality of members, two vertical members and 2 horizontal members. For example, Frame 109 may be made of 1 inch square aluminum tubing. There can be eight lengths of aluminum tubing that make up the entire frame for the screen (two per side). Screen sizes will vary depending on aspect ratio. Frame 109 is held together with aluminum corner connectors and optionally one or more center connectors along each tube. These connectors will typically be manufactured from the same material as each tube and corner connector. Each tube will lock into the corner connectors with a snap button at each connection point.

Frame lower portion 109b is releasably coupled to upper portion 109a via fasteners. During setup, upper portion 109a is put together and then lower portion 109b is attached accordingly. Leg sections 113a/113b of lower portion 109b are telescopic to ease in placement around hitch arm 111. When set up, the bottom of frame 109 is approximately forty inches above hitch arm 111. System 101 is not herein limited to this distance.

Figure 6:
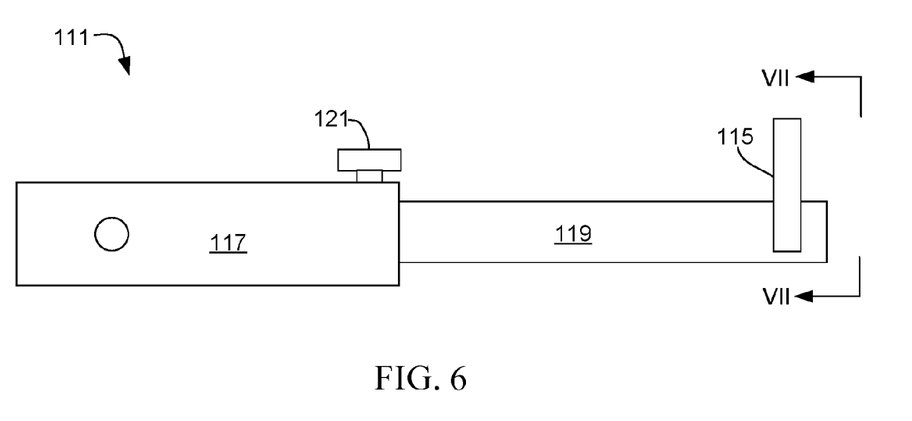
FIG. 6 is a side view of a hitch arm in the frame assembly of FIG. 3.
Figure 7:
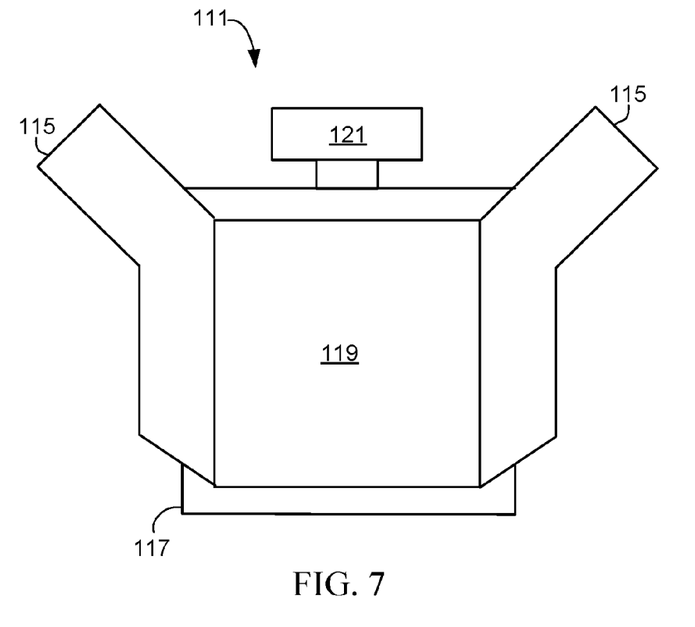
FIG. 7 is a front view of the hitch arm of FIG. 6.

As seen in FIGS. 6 and 7, views of hitch arm 111 are provided. Hitch arm 111 is configured to engage the receiver hitch of the vehicle and provide a suitable method of attachment for frame 109 to be selectively attached. Hitch arm 111 includes tabs 115 configured to protrude out and away from the main body of arm 111. Legs 113a and 113b are configured to translate over each respective tab 115. No fastener is required. Tabs 115 are preferably integrally coupled to the hitch body to ensure stability. An advantage of tabs 115 is that they are symmetrical allowing for frame 109 to be oriented in either a forward or rearward direction relative to the vehicle. It is understood that other known methods of attaching and securing legs 113a/113b to hitch arm 111 are possible, and the illustrated method shown herein is for exemplary purposes.

The main body of hitch arm 111 is separated into a hitch portion 117 and a slider rod 119. Portion 117 is configured similar to that of a conventional hitch used for towing. It is sized and shaped to engage the receiver of the vehicle. Rod 119 is configured to locate tabs 115 at a predetermined distance from the vehicle. In particular, tabs 115 are located through adjustment of rod 119 to accommodate differing projector throw distances when projecting from stand 107 located on a vehicle. It also may be used with stand 105, but is not as necessary given the ability to adjust the positioning of stand 105 without general limitation beyond landscape limitations. Rod 119 translates within portion 117 and is secured by attachment member 121. Member 121 may be in any number of different forms. For example, member 121 may be a pin for inserting into rod 119. Additionally, member 121 may be a threaded knob that uses interference fit or other type of means to secure rod 119.

Figures 8, 9:
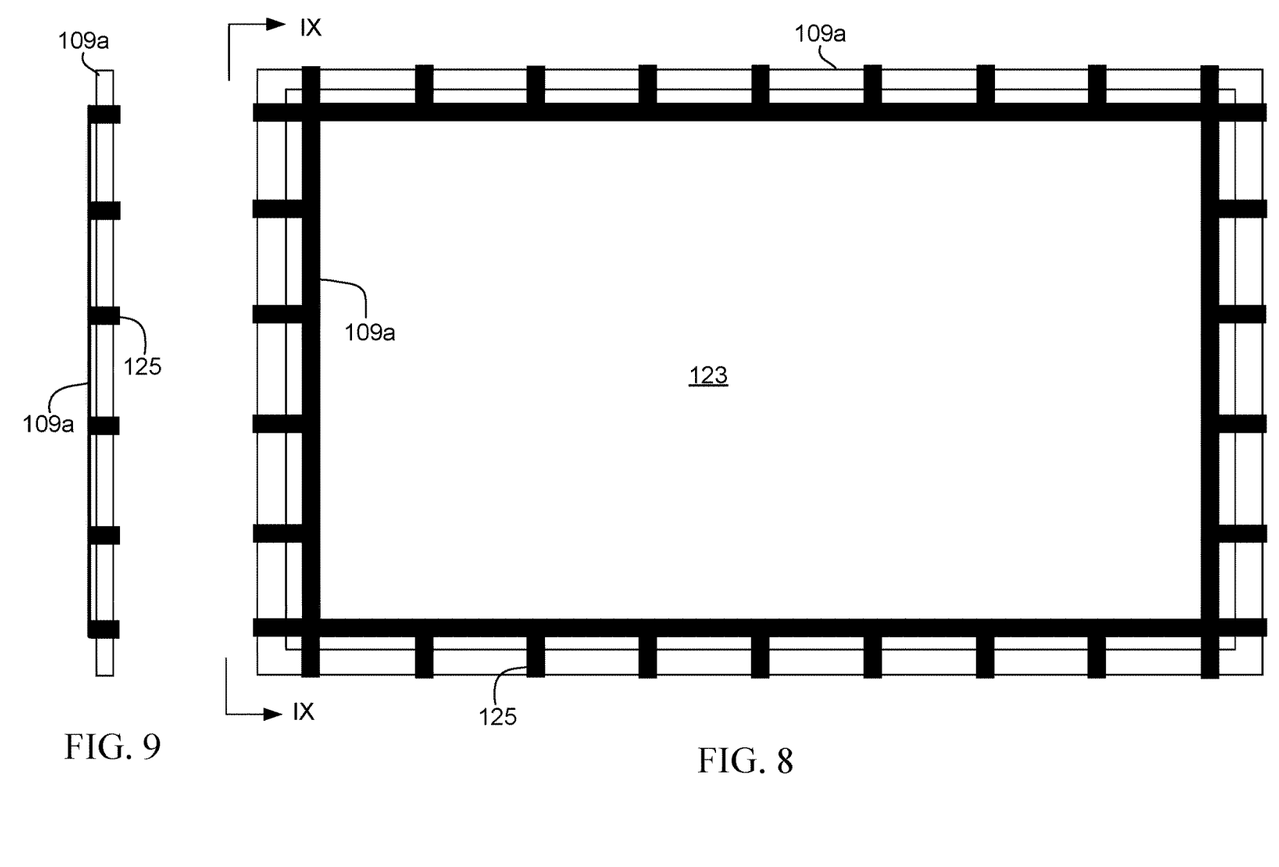
FIG. 8 is a front view of a screen in the hitch mounted theater device and system of FIG. 1.
FIG. 9 is a side view of the screen of FIG. 8.

Referring now also to FIGS. 8 and 9 in the drawings, screen 123 is illustrated attached to frame 109a. Screen 123 is similar in form and function to other common screens in terms of its material, density, coloring, thickness, and so forth. However, screen 123 has some distinguishing features. For example, screen 123 may be made of a coated Nylon material. Screen 123 is coupled to frame 109a with a plurality of straps 125. Straps extend from screen 123 and are secured to frame 109a. Each strap 123 is releasable to allow for adjustment of screen position within frame 109a.

Hook and loop fasteners and other types of fasteners, such as buttons and snaps may be used to ensure the releasable feature of the straps. For example, the front side of frame 109a may be button snaps spaced six inches apart along the entire frame to stretch the fabric screen onto. The adjustability of straps 125 allow for the user to adjust the tension of screen 123 within frame 109a as well. For exemplary purposes, screen 123 may be 111.5 inches wide and 65 inches tall. Other sizing ratios are possible. A band or border 127 (i.e. 2 inches wide) extends around screen 123 to assist in the coupling of straps 125 and to aid in viewing. Another key feature of screen 123 is the optional inclusion of a backing material 129. Backing material 129 is configured to cover screen 123 on the side opposite of viewing to act as a light barrier to further aid in viewing of the images. Backing material 129 may be attached in similar manners as that described with straps 125. Material 129 is releasable and can be attached to either the front or back of screen 123. Ideally, attachment locations for backing material 129 may be in border 127, straps 125 or frame 109a. Use of such removable backing material 129 allow for both rear projection capabilities as well as front projection capabilities.

Figure 10:
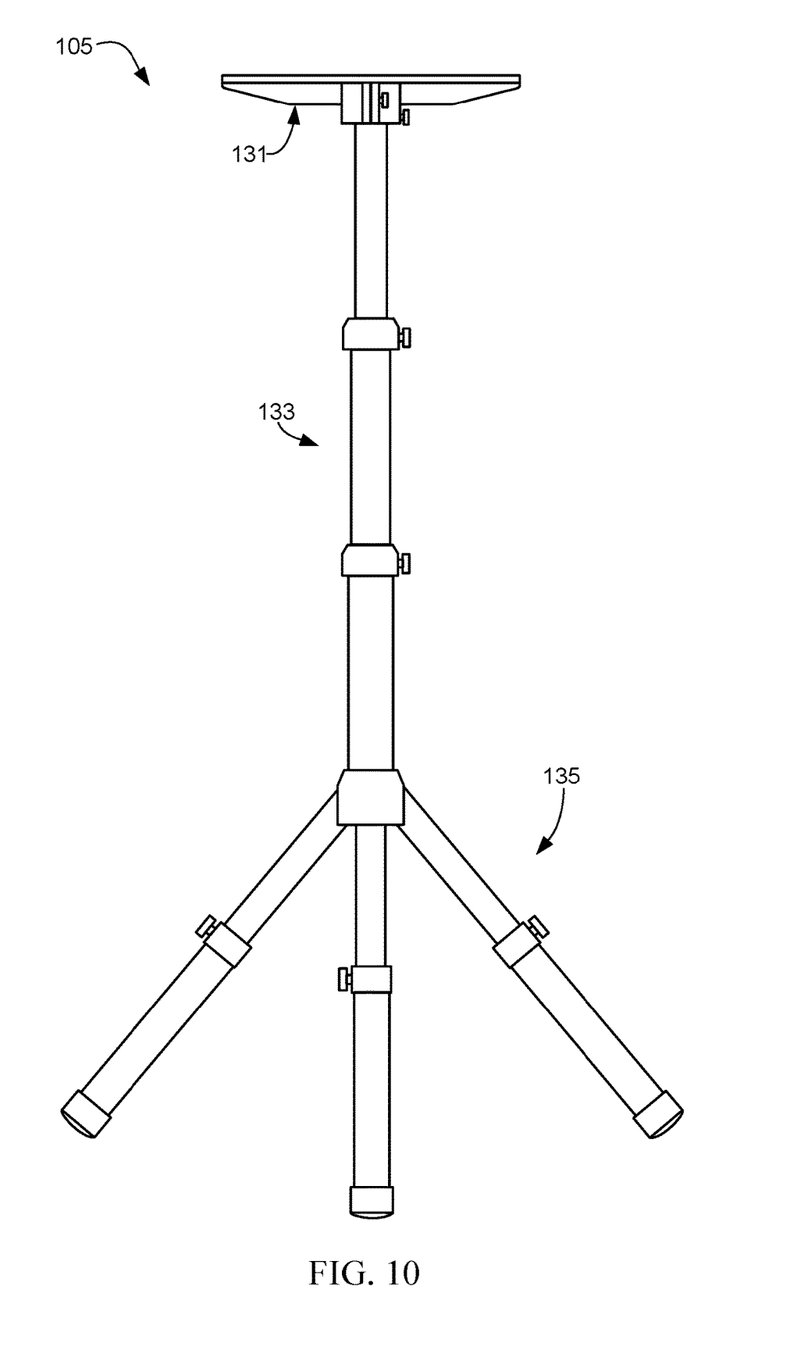
FIG. 10 is a side view of a stand in the hitch mounted theater device and system of FIG. 1.
Figure 11:
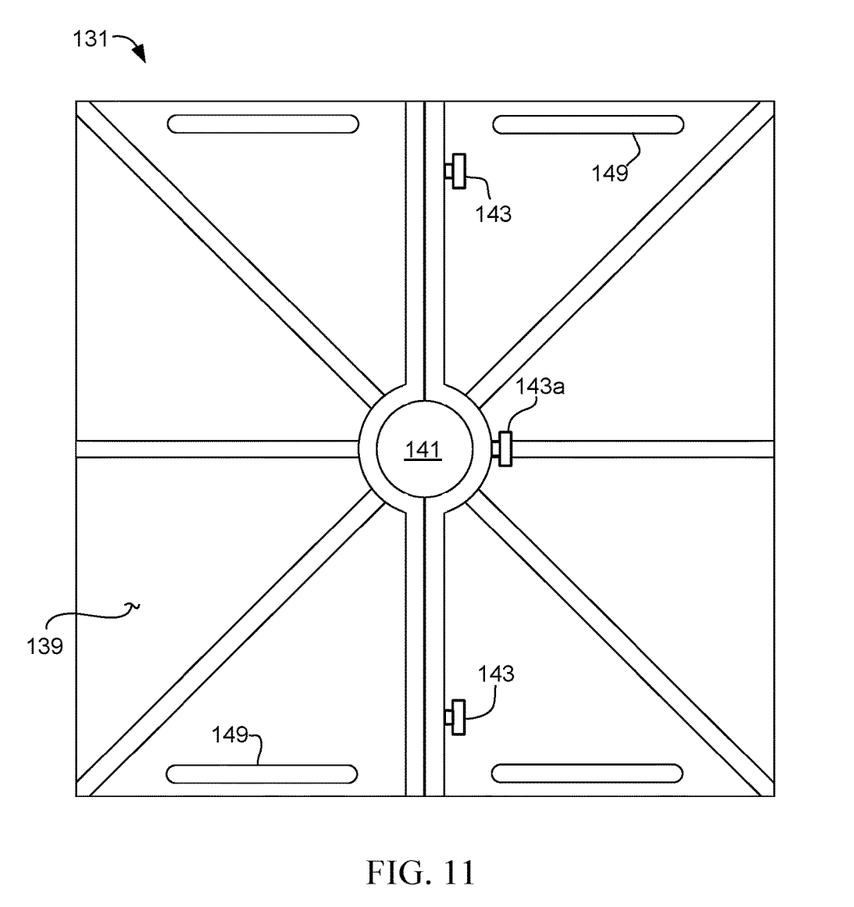
FIG. 11 is a bottom view of a platform in the stand of FIG. 10.
Figure 12:
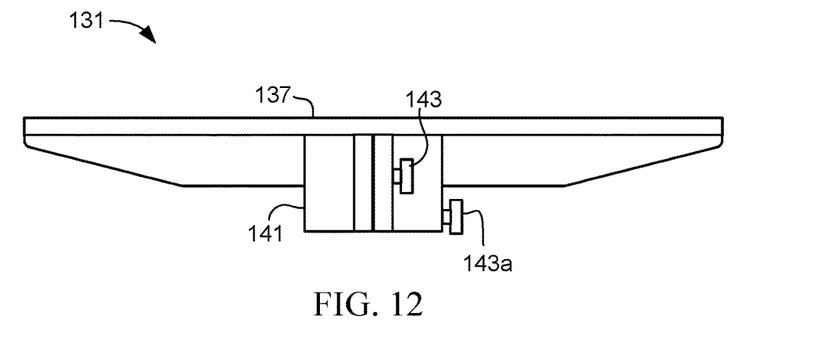
FIG. 12 is a side view of the platform of FIG. 11.

Referring now also to FIG. 10-12 in the drawings, stand 105 is illustrated. Stand 105 is configured for use on the ground, or outside of vehicle 99. Stand 105 includes a platform 131, a central post 133, and a set of legs 135. Platform 131 is configured to provide a stable and relatively flat surface for the support and securing of projector 97. Projector 97 rests upon a top surface 137 of platform 131. Along a bottom surface 139, platform 131 is configured to include a socket 141 for the selective coupling of central post 133. Platform 131 consists of one or more members. As seen in FIG. 11, platform 131 is made from two halves that are secured together via one or more fasteners 143. Post 133 is configured to translate into socket 141 and secured via fastener 143a.

Central post 133 is configured to elevate platform 131. Elevation may be adjusted by extending the length of post 133. Post 133 includes a plurality of telescoping tubes that fit inside each other and lock into place with a fastener 143b. The fasteners may be threaded rods or possibly even snap buttons tensioned with an internal spring. In fact, fasteners 143/143a/143b are all similar in form and function to each other. Post 133 is configured to extend to any height. For example, the height may be 48-102 inches. Legs 135 are similar in form and function to that of post 133 in that each includes a telescoping function to permit adjustment to the various contours of the ground to allow the stand to be adjusted perfectly upright, to accommodate different angles.

Stand 105 may optionally include a plurality of stakes 145 (see FIG. 1) secured in the ground and releasably coupled to any portion of stand 105 (i.e. post 133 or platform 131). These assist in stabilizing platform 131 in unlevel terrain and windy weather especially when post 133 is extended to longer lengths. Additionally, stand 105 may optionally include one or more straps 147 configured to couple to a portion of platform 131 and wrap around a portion of projector 97. These are used to secure projector 97 to platform 131 in the event stand 105 is tipped, bumped, or made unstable. Straps 147 are passed through slots 149 in platform 131.

Figure 13:
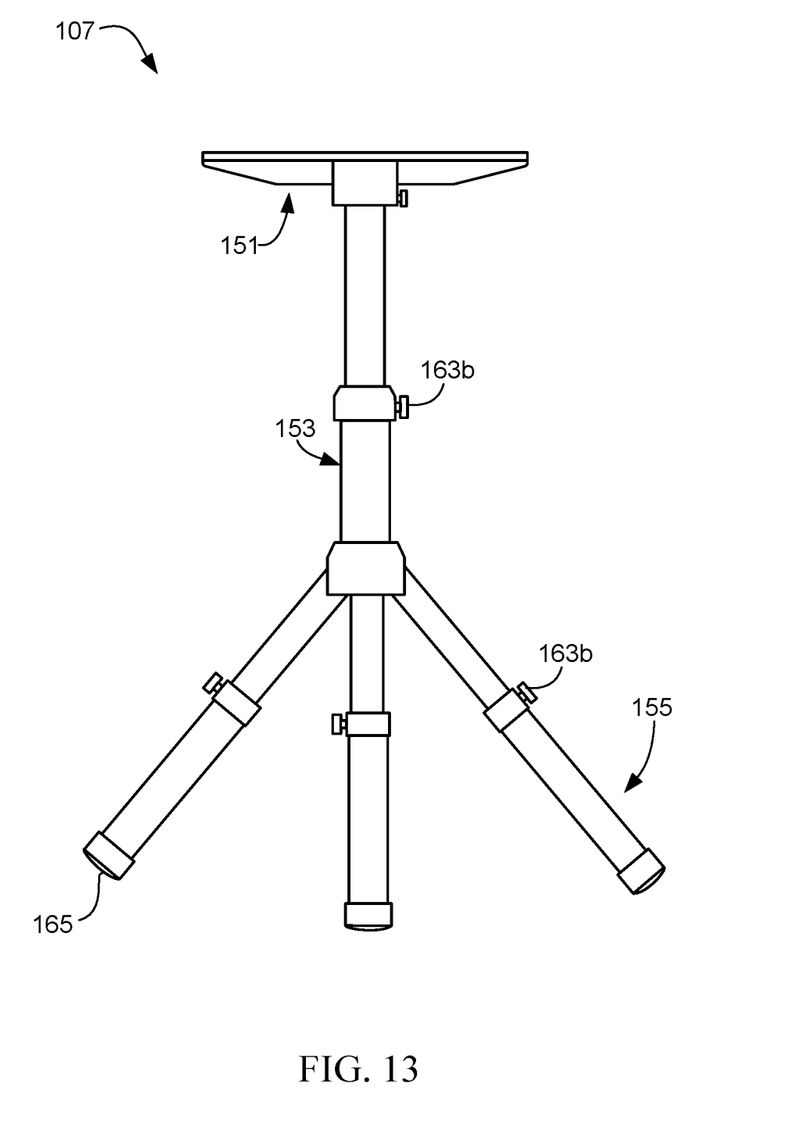
FIG. 13 is a side view of the alternate stand in the hitch mounted theater device and system of FIG. 2.
Figure 14:
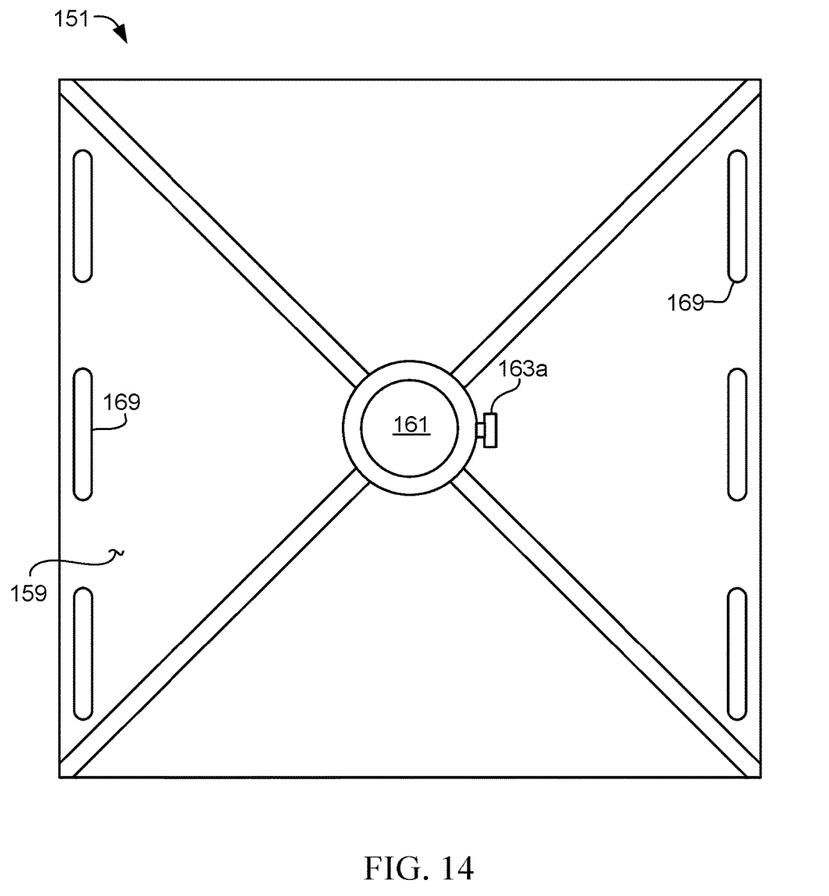
FIG. 14 is a bottom view of a platform in the stand of FIG. 13.
Figure 15:
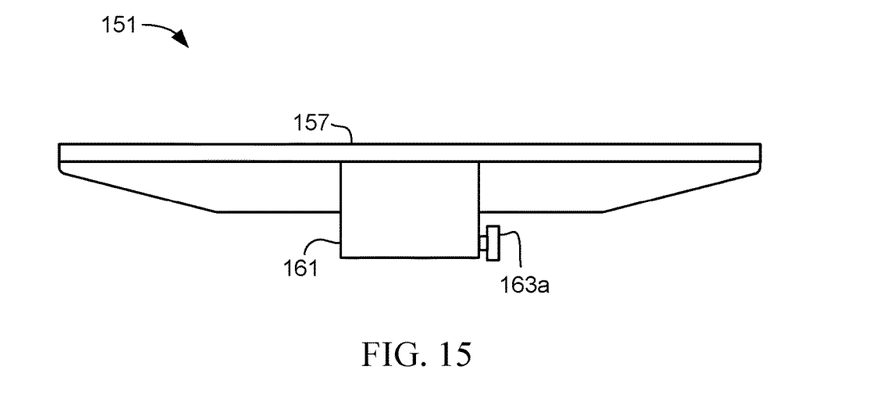
FIG. 15 is a side view of the platform of FIG. 14.

Referring now also to FIGS. 13-15 in the drawings, stand 107 is illustrated. Stand 107 is similar in form, function, and purpose as that of stand 105. Stand 107 differs in that it is configured to be secured to a portion of vehicle 99, such at the top of the roof as seen in FIG. 2. Stand 107 includes a platform 151, a central post 153, and a plurality of legs 155 similarly operable and configured as that of similar parts in stand 105.

Platform 151 is configured to provide a stable and relatively flat surface for the support and securing of projector 97. Projector 97 rests upon a top surface 157 of platform 151. Along a bottom surface 159, platform 151 is configured to include a socket 161 for the selective coupling of central post 153. Platform 151 consists of one or more members. Post 153 is configured to translate into socket 161 and secured via fastener 163a.

Central post 153 is configured to elevate platform 151. Elevation may be adjusted by extending the length of post 153. Post 153 includes one or more telescoping tubes that fit inside each other and lock into place with a fastener 163b. The fasteners may be threaded rods or possibly even snap buttons tensioned with an internal spring. In fact, fasteners 163a/163b are all similar in form and function to each other. Post 153 is configured to extend platform 151 to any height. For example, the height may be 11.5-20 inches.

Legs 155 are similar in form and function to that of post 153 in that each includes a telescoping function to permit adjustment to the various contours of the ground to allow the stand to be adjusted perfectly upright, to accommodate different angles. Each leg 155 of the stand will have a rubber coated magnet foot 165 attached to a ball joint swivel, allowing the magnet to lay flat against uneven truck cab surfaces. Respectively, the magnets in foot 165 may be positioned on the inside of the rubber shoes of each leg. This will secure the stand to the roof of the truck preventing any sliding or toppling over. This makes this stand fully adjustable to the contours of the roof.

Additionally, stand 105 may optionally include one or more straps 167 configured to couple to a portion of platform 151 and wrap around a portion of projector 97. These are used to secure projector 97 to platform 151 in the event stand 107 is tipped, bumped, or made unstable. Straps 167 are passed through slots 169 in platform 151.

It should be understood that platforms 131 and 151 are a relatively square molded plastic material. Additionally, stands 105/107 are configured such that the height of platform 131/151 is fully adjustable to allow the projector to be centered on screen 123. Screen 123 may also be used for front or rear projection.

The current application has many advantages over the prior art including at least the following: (1) a hitch mounted screen; (2) a roof top mounted projection stand; (3) projector stand for either the vehicle or the ground; and (4) collapsible frame assembly for easy transport.

The particular embodiments disclosed above are illustrative only and are not intended to be exhaustive or to limit the invention to the precise form disclosed, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:
1. A hitch mounted theater device, comprising:
a frame assembly having an upper portion and a lower portion, the upper portion configured to support a screen;
a hitch mount configured to locate the frame assembly off a ground, the lower portion configured to releasably couple to the hitch mount and support the upper portion relative to the hitch mount, the frame being independent from the hitch mount whereby the frame is rotated relative to the hitch mount thereby changing an orientation of the screen;

a screen releasably coupled to the upper portion of the frame via one or more straps, the one or more straps locating the screen within the upper portion;

a stand; and a displaying device releasably coupled to the stand, the displaying device broadcasting images to the screen for viewing.

2. The device of claim 1, wherein the stand is configured to rest on a vehicle.

3. The device of claim 1, wherein the stand is configured to rest on the ground.

4. The device of claim 1, wherein the stand includes telescoping members configured to adjust a height of a platform.

5. The device of claim 4, wherein the platform is configured to support the displaying device.

6. The device of claim 1, wherein the stand includes a releasable strap for securing the displaying device.

7. The device of claim 1, wherein the stand includes one or more stakes for securing the stand in an upright orientation.

8. The device of claim 1, wherein the stand further includes a magnetized foot member configured to attract to the body of a vehicle.

9. The device of claim 1, wherein the hitch mount is configured to engage a receiver in communication with a vehicle.

10. The device of claim 1, wherein the hitch mount includes a hitch arm with a slider rod configured to adjust a distance between the screen and a vehicle.

11. The device of claim 1, further comprising:

a backing material behind the screen, the backing material removably coupled to the screen independent of the frame, the backing material used to restrict passage of light through the screen.

12. The device of claim 1, wherein the orientation of the screen may be changed between a rearward and forward orientation.

13. A method of displaying images on a screen, comprising:

erecting a frame suitable for holding a screen, the frame having an upper portion and a lower portion, the upper portion configured to support the screen;

attaching the screen to the frame via one or more straps, the one or more straps locating the screen within the frame;

coupling the frame to a receiver on a vehicle, the frame including a hitch mount, the lower portion configured to releasably couple to the hitch mount;

switching an orientation of the screen by rotating the frame relative to the hitch mount, the rotation of the frame being independent from the hitch mount;

locating a stand a predetermined distance from the screen; and securing a projector to the stand with one or more straps thereby broadcasting images onto the screen.

14. The method of claim 13, wherein the stand is located on a vehicle.

15. The method of claim 13, wherein the stand includes a magnetized foot for attraction to a vehicle.

16. The method of claim 13, further comprising:

adjusting a height of the stand so as to affect visual acuteness of displayed images.

* * * * *